(12) United States Patent
Fontana

(10) Patent No.: US 9,051,867 B2
(45) Date of Patent: Jun. 9, 2015

(54) DIAGNOSTICS FOR HYDROCARBON INJECTION FOR FILTER REGENERATION

(75) Inventor: Massimo Fontana, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 5 days.

(21) Appl. No.: 13/877,821

(22) PCT Filed: Oct. 4, 2010

(86) PCT No.: PCT/US2010/051276
§ 371 (c)(1),
(2), (4) Date: Apr. 4, 2013

(87) PCT Pub. No.: WO2012/047193
PCT Pub. Date: Apr. 12, 2012

(65) Prior Publication Data
US 2013/0227935 A1 Sep. 5, 2013

(51) Int. Cl.
| | |
|---|---|
| *F01N 3/00* | (2006.01) |
| *F01N 11/00* | (2006.01) |
| *F01N 3/025* | (2006.01) |
| *F01N 3/035* | (2006.01) |
| *F01N 3/10* | (2006.01) |
| *F01N 9/00* | (2006.01) |
| *F01N 13/00* | (2010.01) |

(52) U.S. Cl.
CPC .............. *F01N 11/00* (2013.01); *F01N 3/0253* (2013.01); *F01N 3/035* (2013.01); *F01N 3/106* (2013.01); *F01N 9/002* (2013.01); *F01N 11/002* (2013.01); *F01N 2560/06* (2013.01); *F01N 2560/07* (2013.01); *F01N 2560/14* (2013.01); *Y02T 10/47* (2013.01); *F01N 13/009* (2014.06)

(58) Field of Classification Search
USPC .................... 60/274, 276, 277, 286, 295, 303
See application file for complete search history.

(56) References Cited

U.S. PATENT DOCUMENTS

| | | | | |
|---|---|---|---|---|
| 8,156,730 | B2* | 4/2012 | Guo et al. ........................ | 60/280 |
| 8,387,365 | B2* | 3/2013 | Thouvenel et al. ............. | 60/277 |
| 8,418,441 | B2* | 4/2013 | He et al. .......................... | 60/286 |
| 8,713,914 | B2* | 5/2014 | Schmieg et al. ................ | 60/277 |

* cited by examiner

*Primary Examiner* — Binh Q Tran
(74) *Attorney, Agent, or Firm* — Jeffrey P. Calfa; Mark C. Bach

(57) ABSTRACT

A method of determining a malfunction in a hydrocarbon injection system for an internal combustion engine having an exhaust system with a diesel particulate filter and a diesel oxidation catalyst, is provided. An efficiency of a diesel oxidation catalyst to convert hydrocarbons injected for regeneration of a diesel particulate filter into heat is estimated based upon an input temperature of the diesel oxidation catalyst, an output temperature of the diesel oxidation catalyst, and an output temperature of a diesel particulate filter. The estimated efficiency is compared to a predetermined stored efficiency value. An indication of a malfunction is generated when the comparison of the estimated efficiency to the predetermined stored efficiency exceeds a threshold amount.

9 Claims, 1 Drawing Sheet

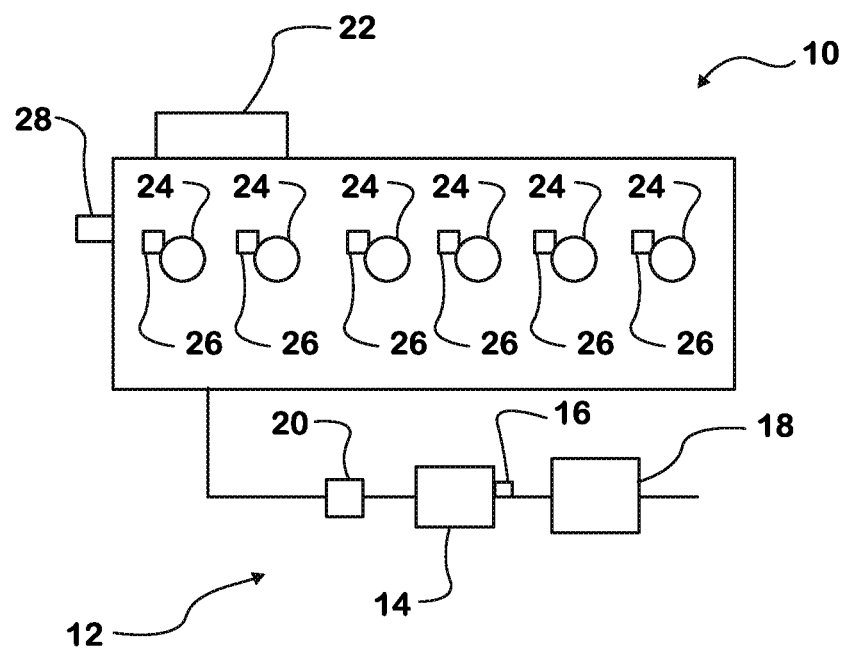

US 9,051,867 B2

DIAGNOSTICS FOR HYDROCARBON INJECTION FOR FILTER REGENERATION

TECHNICAL FIELD

The present disclosure relates to regeneration of diesel particulate filters, and more particularly to a system and method for regenerating a diesel particulate filter using a system that delivers hydrocarbons used during regeneration of the diesel particulate filter to either, or both, an engine cylinder as an in-cylinder post injection, or as an injection within the exhaust system upstream of a diesel oxidation catalyst and the diesel particulate filter.

BACKGROUND

Many factors, including environmental responsibility efforts and modern environmental regulations on engine exhaust emissions, have reduced the allowable acceptable levels of certain pollutants that enter the atmosphere following the combustion of fossil fuels. Increasingly, more stringent emission standards may require greater control over either or both the combustion of fuel and post combustion treatment of the exhaust. For example, the allowable levels of nitrogen oxides (NOx) and particulate matter have been greatly reduced over the last several years. To address, among other issues, environmental concerns, many diesel engines now have a diesel oxidation catalyst (DOC) as well as a diesel particulate filter (DPF) within an exhaust system of the diesel engine purposed to reduce the amount of NOx and particulate matter released into the atmosphere.

In some diesel engine operating conditions it may be beneficial to provide hydrocarbons, typically in the form of diesel fuel, directly to the exhaust system of the engine at a location upstream of the DOC such that the hydrocarbons will react with the DOC to produce heat and raise temperatures within the DPF to a point sufficient to allow regeneration of the DPF. Unfortunately, hydrocarbons do not always react as desired with the DOC, and sometimes hydrocarbons slip through the DOC and enter the DPF where they may combust and result in unintended heat release and exhaust gas creation, a condition referred to as "hydrocarbon slip.". The unintended exhaust gas creation often is visible as white exhaust smoke. The combustion of hydrocarbons that slip through the DOC and enter the DPF may cause damage to the DPF.

There are several causes for hydrocarbon slip, such as insufficient oxygen within the exhaust system to allow the hydrocarbons to combust in the DOC, an aged, damaged, or inefficient DOC, and a hydrocarbon injector that is leaking hydrocarbons or is injecting more hydrocarbons than anticipated. Systems to estimate the oxygen available for hydrocarbon combustion in an exhaust system and limit hydrocarbon injection accordingly have been developed, therefore, a need exists for a system and method to detect hydrocarbon slip through a DOC based upon the DOC being aged, damaged, or inefficient as well as hydrocarbon slip through a DOC based upon a hydrocarbon injector that is leaking or is injecting more hydrocarbons than anticipated.

SUMMARY

According to one process, a method of detecting malfunctions in a system for providing hydrocarbons to an engine exhaust for regenerating a diesel particulate filter within an exhaust system of a diesel engine is provided. The diesel engine comprises an electronic control module, at least one cylinder, and at least one fuel injector in fluid communication with the at least one cylinder, and a diesel oxidation catalyst within the exhaust system. A flow rate of exhaust gas through the exhaust system is monitored with the electronic control module. A temperature of a diesel oxidation catalyst input is monitored with the electronic control module. A temperature of a diesel oxidation catalyst output is monitored with the electronic control module. A temperature of a diesel particulate filter output is monitored with the electronic control module. An efficiency of converting hydrocarbons within the diesel oxidation catalyst into heat with the electronic control module is determined. The determined efficiency of combustion of hydrocarbons within the diesel oxidation catalyst is compared to a predefined efficiency. An alarm is generated when the difference in the determined efficiency is above a first predetermined limit and below a second predetermined limit.

According to one embodiment, a physical computer program product, comprises a computer usable medium that has an executable computer readable program code embodied therein. The executable computer readable program code implements a method of detecting malfunctions in a system for providing hydrocarbons to an engine exhaust for regenerating a diesel particulate filter. Flow rate of exhaust gas through the exhaust system is monitored with the electronic control module. Temperature of a diesel oxidation catalyst input is monitored with the electronic control module. Temperature of a diesel oxidation catalyst output is monitored with the electronic control module. Temperature of a diesel particulate filter output is monitored with the electronic control module. An efficiency of converting hydrocarbons within the diesel oxidation catalyst into heat with the electronic control module is determined. The determined efficiency of combustion of hydrocarbons within the diesel oxidation catalyst is compared to a predefined efficiency. An alarm is generated when the difference in the determined efficiency is above a first predetermined limit and below a second predetermined limit.

According to another process, a method of determining a malfunction in a hydrocarbon injection system for an internal combustion engine having an exhaust system with a diesel particulate filter and a diesel oxidation catalyst, is provided. An efficiency of a diesel oxidation catalyst to convert hydrocarbons injected for regeneration of a diesel particulate filter into heat is estimated based upon an input temperature of the diesel oxidation catalyst, an output temperature of the diesel oxidation catalyst, and an output temperature of a diesel particulate filter. The estimated efficiency is compared to a predetermined stored efficiency value to determine a difference [Δ] between the estimated efficiency and the predetermined stored efficiency value. An alarm is generated when the difference [Δ] is one of either greater than a first predetermined threshold and less than a second predetermined threshold.

BRIEF DESCRIPTION OF THE DRAWINGS

FIG. 1 is a schematic diagram showing an engine having an exhaust system with an diesel particulate filter a diesel oxidation catalyst, and a hydrocarbon injector disposed in the exhaust system.

DETAILED DESCRIPTION

FIG. 1 shows an engine 10 having an exhaust system 12. The exhaust system 12 comprises a diesel oxidation catalyst (DOC) 14, a DOC temperature sensor 16, a diesel particulate filter (DPF) 18, and an exhaust system hydrocarbon injector 20. The engine 10 additionally has an electronic control module (ECM) 22, sometimes referred to as an engine control module, or an engine control unit. The ECM 22 control operations of many aspects of the engine 10, such as fuel injection, emissions based engine settings, combustion based engine settings, and DPF regeneration, to name a few. The DOC temperature sensor 16 is in communication with the ECM 22

The engine 10 additionally has a plurality of cylinders 24, each of which has a fuel injector 26. The fuel injector 26 are capable of performing multiple injection of fuel per cylinder for each combustion cycle, such as a pre-injection, a main injection, and a post-injection, where the main injection is the fuel injection to provide the required power output of the engine 10, while the pre-injection occurs before the main injection, and the post-injection occurs after the main injection.

The engine 10 additionally has an engine speed sensor 28 that is also in communication with the ECM 22 and is used to determine the speed that the engine is running.

As shown in FIG. 1, the DOC 14 is located upstream of the DPF 18. The exhaust system hydrocarbon injector 20 is disposed upstream of the DOC 14. The DOC temperature sensor 16 generates a temperature reading of both the entrance of the DOC 14 and the exit of the DOC 14. It is also contemplated that separate sensors may be utilized to obtain temperature of the input of the DOC 14 and temperature of the exit of the DOC 14. The exhaust system hydrocarbon injector 20 injects hydrocarbons, such as diesel fuel, into the exhaust system 12 in order to raise the temperature of the DOC 14, as well as exhaust within the exhaust system 12. The DPF may undergo regeneration when the temperature within the exhaust system 12 is above a certain level.

In order to diagnosis hydrocarbon slip through the DOC, the ECM 22 may calculate an instantaneous energy balance equation for the combustion of hydrocarbons in the DOC as:
$\eta(t)*\dot{m}_{HC}(t)*LHV = \dot{m}_{gas}(t)*(C_{p2}*T_{out}(t) - C_{p1}*T_{in}(t)) + \dot{q}_{loss}(t) + \dot{u}(t)$, Where n(t) is the efficiency of the DOC to convert hydrocarbons to heat;

$\dot{m}_{HC}(t)$ is an instantaneous flow rate of hydrocarbons being injected into an exhaust system;

LHV is a lower heating value of the hydrocarbon being injected;

$\dot{m}_{gas}(t)$ is an instantaneous exhaust gas flow rate;

$C_{p1} = C_p(T_{out}(t))$ and $C_{p2} = C_p(T_{in}(t))$ are specific heat capacities at constant pressure, both of which are non-linear functions of temperature;

$T_{out}(t)$ and $T_{in}(t)$ are absolute temperatures, in Kelvin, of exhaust gas entering and exiting the DOC;

$\dot{q}_{loss}(t)$ is power lost to the surrounding environment as heat; and $\dot{u}(t)$ is instantaneous variation in internal energy of the DOC that is caused primarily by final products created during chemical reactions within the DOC, however, this value is typically assumed to be zero to simplify calculations, by assuming that the internal material and substances of the DOC that are involved with the chemical reaction do not mutate into different substances.

The above equation has a drawback of being dependent on time phenomenon not synchronous with each other, and as hydrocarbon combustion may vary substantially from moment to moment, a less time dependant calculation may be desirable. Therefore, by integrating over time, the average efficiency of the DOC may be calculated using the equation:

$$\eta_{Ave\_DOC} \cong \frac{\int \dot{m}_{gas}*(C_{p2}*T_{out\_DOC} - C_{p1}*T_{in\_DOC})*dt + Q_{loss\_DOC}}{\int \dot{m}_{HC}*LHV*dt}.$$

It is also common to estimate that no heat is lost from the DOC during regeneration, causing $Q_{loss\_DOC} \approx 0$, and the average efficiency of the DOC becomes:

$$\eta_{Ave\_DOC} \cong \frac{\int \dot{m}_{gas}*(C_{p2}*T_{out\_DOC} - C_{p1}*T_{in\_DOC})*dt}{\int \dot{m}_{HC}*LHV*dt}.$$

This equation is generally accepted for controlling DPF regeneration based on energy balance of the combustion of hydrocarbons within the DOC.

In some instances, the total amount of heat lost from the DOC during regeneration of the DPF will be significant when compared to the total energy of the hydrocarbons introduced into the exhaust system. Heat loss of the DOC during regeneration of the DPF is a more relevant factor when vehicle speed is high and ambient temperatures are low. Therefore, a way to estimate heat loss from the DOC, $Q_{loss\_DOC}$, is needed. Assuming that all hydrocarbons are converted to heat, the efficiency n(t)=1, thus total heat loss for both the DOC and the DPF, $Q_{loss\_TOTAL}$, may be estimated as:
$Q_{loss\_TOTAL} = \int \dot{m}_{HC}*LHV*dt - \int \dot{m}_{gas}*(C_{p3}*T_{out\_DPF} - C_{p1}*T_{in\_DOC})*dt - \Delta U$ where only $\Delta U$ is an unknown. $\Delta U$ is the difference between energy absorbed by particulate matter within the DPF and energy released by the particulate matter in the DPF during regeneration of the DPF. Assuming that $\Delta U$ is negative, then an estimated total heat loss in both the DOC and the DPF is found according to the formula:
$Q_{loss\_TOTAL\_Estimate} = \int \dot{m}_{HC}*LHV*dt - \int \dot{m}_{gas}*(C_{p3}*T_{out\_DPF} - C_{p1}*T_{in\_DOC})*dt$, and that $0 < Q_{loss\_TOTAL\_Estimate} < Q_{loss\_TOTAL}$. Further assuming that the portion of $Q_{loss\_TOTAL\_Estimate}$ that is attributable to heat loss in the DOC is a fixed percentage of the $Q_{loss\_TOTAL\_Estimate}$ that only depends on the surface area of the DOC compared to the surface area of the DPF, and amount of heat lost from the DOC during regeneration, $Q_{loss\_DOC}$ may be estimated. The formula:

$$Q_{loss\_DOC} \approx Fac_A * Q_{loss\_TOTAL\_Estimate},$$

where $$Fac_A = \frac{A_{DOC}}{A_{DOC} + A_{DPF}}$$

and $A_{DOC}$ is the surface area of the DOC and $A_{DPF}$ is the surface area of the DPF may be used to estimate the heat loss of the DOC. Thus, heat loss at the DOC may be estimated and included in an estimate of the efficiency of the DOC in converting hydrocarbons into heat needed to raise the temperature of exhaust gas required to regenerate the DPF. For diagnostic purposes, an exact efficiency of the DOC in converting hydrocarbons to heat is not required, rather, the estimate of efficiency is only required to detect degrading performance of the DOC in converting hydrocarbons to heat, such that hydrocarbon slip through the DOC may be predicted. It is contemplated that the ECM will contain an efficiency estimate for a brand new DOC, and then the efficiency of the DOC during subsequent DPF regeneration cycles will be compared to the efficiency estimate for the new DOC. Therefore, degradation in efficiency of the DOC converting hydrocarbons to heat will be observed, and appropriate alarms, service reminders, or alerts may be provided.

Another formula that may be utilized to provide an indication of whether hydrocarbon slip is occurring based on efficiency of the DOC in converting hydrocarbons to heat is:

$$\eta_{Ave\_DOC} \cong \frac{\int \dot{m}_{gas} * (C_{p2} * T_{out\_DOC} - C_{p1} * T_{in\_DOC}) * dt + Q_{loss\_DOC}}{\int \dot{m}_{gas}^* * (C_{p3} T_{out\_DPF} - C_{p1} T_{in\_DOC}) * dt + \Delta U + Q_{loss\_TOTAL}},$$

where $T_{out\_DPF}$ is the output temperature of the DPF, and $C_{p3}$ is a specific heat capacity at constant pressure. The above equation may be simplified by assuming that $Q_{loss\_TOTAL} \approx 0$, that $Q_{loss\_DOC} \approx 0$, and that $\Delta U \approx 0$ resulting in the equation:

$$\eta_{slip\_DOC} \cong \frac{\int \dot{m}_{gas} * (C_{p2} * T_{out\_DOC} - C_{p1} * T_{in\_DOC}) * dt}{\int \dot{m}_{gas}^* * (C_{p3} T_{out\_DPF} - C_{p1} T_{in\_DOC}) * dt}.$$

The value of $\eta_{slip\_DOC}$ should be much less than 1 when hydrocarbons are slipping through the DOC, as the output temperature of the DPF, $T_{out\_DPF}$, will rise substantially when hydrocarbons are slipping through the DOC.

Utilizing the above equations for $\eta_{slip\_DOC}$ and $\eta_{Ave\_DOC}$ it is possible to determine when hydrocarbon slip is occurring because of inefficient operation of the DOC, or when an overflow of hydrocarbons from a hydrocarbon injector is occurring. An inefficient DOC causes the efficiency, $\eta_{Ave\_DOC}$, to degrade slowly over time when compared to a threshold or reference value for the efficiency of the DOC. Efficiency degradation of the DOC will cause a higher volume of hydrocarbons to be injected into the exhaust system in order to reach the required DOC output temperature to cause regeneration of the DPF. Thus, the calculated, or estimated, efficiency of the DOC will be lowered as the flow rate of hydrocarbons is raised. Thus, the value of $\eta_{slip\_DOC}$ will be much lower than 1 when hydrocarbon slip is occurring because of inefficient operation of the DOC, since the temperature of the output of the DPF will be much higher than the input temperature of the DOC due to the heat released from combusting hydrocarbons within the DPF. As the transition to an inefficient DOC will occur gradually over time, a malfunction may only be indicated when two consecutive DPF regenerations result in a $\eta_{Ave\_DOC}$ being lower than the threshold value and an alarm may be provided.

Another malfunction that may be determined based upon the efficiency $\eta_{Ave\_DOC}$ of the DOC is an over-flowing hydrocarbon injector. An over-flowing hydrocarbon injector will result in an increase in $\eta_{Ave\_DOC}$, as more hydrocarbons are being injected into the DOC than the ECM believes are being injected, therefore $\dot{m}_{HC}$ will be smaller than the actual flow rate of hydrocarbons into the DOC. This will result in an improvement in $\eta_{Ave\_DOC}$ from the previous calculated efficiency. Thus, if $\eta_{Ave\_DOC}$ is greater than a stored threshold value, a malfunction may be indicated, and an alarm provided, that is likely caused by an over-flowing hydrocarbon injector. Similarly, if $\eta_{Ave\_DOC}$ is greater than the previous calculated efficiency, a malfunction may be indicated, and an alarm provided, likely caused by an over-flowing hydrocarbon injector. Hydrocarbon slip through the DOC can occur when an over-flowing hydrocarbon injector is present, particularly when the DOC does not contain sufficient oxygen to combust the excess hydrocarbons being injected based on the over-flowing hydrocarbon injector.

Yet another malfunction may be determined by the efficiency $\eta_{Ave\_DOC}$ of the DOC, and that malfunction is an under-flowing hydrocarbon injector. An under-flowing hydrocarbon injector will result in a low calculated efficiency $\eta_{Ave\_DOC}$, since less hydrocarbons are being injected than expected, thus the value of $\dot{m}_{HC}$ will be higher than the actual flow rate of the hydrocarbon. This malfunction may be mistaken for an inefficient DOC. However, the under-flowing hydrocarbon injector is more likely to result in a sudden drop in $\eta_{Ave\_DOC}$, not the gradual decrease caused by an inefficient DOC. When an under-flowing injector is present, hydrocarbon slip is not likely to occur, however, a malfunction should be detected, and an alarm provided, as the under-flowing injector may not allow a DPF regeneration to occur properly.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a "computer-readable medium" can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical) and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A method of detecting malfunctions in a system for providing hydrocarbons to an engine exhaust for regenerating a diesel particulate filter within an exhaust system of a diesel engine, the diesel engine comprising an electronic control module, at least one cylinder, and at least one fuel injector in fluid communication with the at least one cylinder, and a diesel oxidation catalyst within the exhaust system, the method comprising:

monitoring flow rate of exhaust gas through the exhaust system and generating a signal to the electronic control module representative of the flow rate of exhaust gas passing through the system;

monitoring temperature of a diesel oxidation catalyst input and generating a signal to the electronic control module representative of the temperature of the diesel oxidation catalyst input;

monitoring temperature of a diesel oxidation catalyst output and generating a signal to the electronic control module representative of the temperature of the diesel oxidation catalyst output;

monitoring temperature of a diesel particulate filter output and generating a signal to the electronic control module representative of the temperature of the diesel particulate filter output;

the electronic control module being structured to process the flow rate, diesel oxidation catalyst input temperature, diesel oxidation catalyst output temperature, and diesel particulate filter output temperature signals and determining an average efficiency of converting hydrocarbons within the diesel oxidation catalyst into heat;

the electronic control module structured to compare the determined efficiency of combustion of hydrocarbons within the diesel oxidation catalyst to a predefined efficiency; and the electronic control module structured to generate an alarm signal when the difference in the determined average efficiency is above a first predetermined limit and below a second predetermined limit.

2. The method of claim 1, wherein electronic control module is structured to generate a first malfunction signal indicating that the malfunction is an inefficient diesel oxidation catalyst when the determined efficiency is lower than the predefined efficiency, and the electronic control module is structured to generate a second malfunction signal when the determined efficiency is higher than the predefined efficiency.

3. A physical computer program product, comprising a computer usable medium having an executable computer readable program code embodied therein, the executable computer readable program code for implementing a method of detecting malfunctions in a system for providing hydrocarbons to an engine exhaust for regenerating a diesel particulate filter, the method comprising:

monitoring flow rate of exhaust gas through the exhaust system with the electronic control module;

monitoring temperature of a diesel oxidation catalyst input with the electronic control module;

monitoring temperature of a diesel oxidation catalyst output with the electronic control module;

monitoring temperature of a diesel particulate filter output with the electronic control module;

determining an average efficiency of converting hydrocarbons within the diesel oxidation catalyst into heat with the electronic control module;

comparing the determined average efficiency of combustion of hydrocarbons within the diesel oxidation catalyst to a predefined efficiency; and generating an alarm when the difference in the determined efficiency is above a first predetermined limit and below a second predetermined limit.

4. The physical computer program product of claim 3, wherein the determining of the efficiency of combustion is based on the temperature of the diesel oxidation catalyst input, the temperature of the diesel oxidation catalyst output, and the temperature of the diesel particulate filter output.

5. The physical computer program product of claim 3, wherein the indicated malfunction is an inefficient diesel oxidation catalyst when the determined efficiency is lower than the predefined efficiency.

6. The physical computer program product of claim 3, wherein the indicated malfunction is a hydrocarbon injector over-flow when the determined efficiency is higher than the predefined efficiency.

7. The physical computer program product of claim 3, wherein the indicated malfunction is one of an inefficient diesel oxidation catalyst and a hydrocarbon injector under-flow when the determined efficiency is lower than the predefined efficiency.

8. The physical computer program product of claim 7, wherein the indicated malfunction is an inefficient diesel oxidation catalyst when the determined efficiency is substantially lower than the predefined efficiency.

9. The method of claim 3, wherein a first percent of the total amount of hydrocarbons are injected into the exhaust system upstream of the diesel oxidation catalyst, and a second percent of the total amount of hydrocarbons are injected into the at least one cylinder with a fuel injector as a post injection, the first percent and the second percent varying over time based upon changes in engine torque output.

* * * * *